(12) United States Patent
Lase

(10) Patent No.: US 8,083,111 B2
(45) Date of Patent: Dec. 27, 2011

(54) TRACTOR MOUNTED TOOLBOX

(76) Inventor: John J. Lase, Neola, IA (US)

( * ) Notice: Subject to any disclaimer, the term of this patent is extended or adjusted under 35 U.S.C. 154(b) by 499 days.

(21) Appl. No.: 12/383,092

(22) Filed: Mar. 19, 2009

(65) Prior Publication Data

US 2010/0236955 A1 Sep. 23, 2010

(51) Int. Cl.
*B65D 85/28* (2006.01)
(52) U.S. Cl. .......................... 224/410; 224/400
(58) Field of Classification Search ................ 224/410, 224/400; 206/373
See application file for complete search history.

(56) References Cited

U.S. PATENT DOCUMENTS

| | | | | |
|---|---|---|---|---|
| 3,848,736 A * | 11/1974 | Eshelman | ...................... | 206/577 |
| 5,370,263 A * | 12/1994 | Brown | .......................... | 220/751 |
| 5,456,357 A * | 10/1995 | Wenner et al. | ................ | 206/372 |
| 5,459,648 A * | 10/1995 | Courtney | ....................... | 362/154 |
| 5,601,206 A * | 2/1997 | Haas et al. | .................... | 220/527 |
| 5,713,468 A * | 2/1998 | Streichan | ...................... | 206/372 |
| 6,595,397 B2 | 7/2003 | Teich | | |
| 7,204,397 B2 * | 4/2007 | Powell et al. | ................ | 224/410 |
| 7,334,713 B1 * | 2/2008 | Turner | ........................... | 224/519 |
| 2007/0235486 A1 * | 10/2007 | Bernard | ......................... | 224/400 |

* cited by examiner

*Primary Examiner* — Brian D Nash
(74) *Attorney, Agent, or Firm* — Dennis L. Thomte; Thomte Patent Law Office LLC

(57) ABSTRACT

A toolbox is selectively removably mounted on the weight support positioned at the forward end of a tractor. In the preferred embodiment, a plurality of weights are positioned on the weight support at each side of the toolbox and are interconnected together.

5 Claims, 5 Drawing Sheets

TRACTOR MOUNTED TOOLBOX

BACKGROUND OF THE INVENTION

1. Field of the Invention

This invention relates to a tractor mounted toolbox and more particularly to a toolbox which is mounted on the weight support positioned on the forward end of a tractor.

2. Description of the Related Art

Many types of toolboxes have been previously provided on tractors with many of the same having been rigidly secured thereto or incorporated into some structure of the tractor. However, the prior art method of mounting the toolbox on the tractor normally takes up operator space and is not convenient to use.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A toolbox is disclosed which is mounted on the horizontally extending weight support at the forward end of a tractor. The weight support has first and second ends and rearward and forward sides with the toolbox being selectively removably positioned generally at the forward side of the weight support. The toolbox is generally rectangular in shape and has a length less than the length of the weight support. The toolbox comprises a bottom wall, a front wall, a back wall, a first end wall, a second end wall and a lid which selectively closes the upper end of the toolbox. The rearward ends of the side walls of the toolbox each have a recess or cutout formed therein which is adapted to receive the weight support therein. Each of the recesses or cutouts at the rearward ends of the end walls of the toolbox have a notch formed therein at the upper forward end thereof which receives the upwardly extending lip at the upper forward end of the weight support. A bracket is secured to the rearward side of the back wall of the toolbox and a pin extends through the bracket into the weight support to selectively removably secure the toolbox to the weight support.

Preferably, a plurality of first weights are selectively removably mounted on the weight support laterally outwardly of the first end wall of the toolbox and a plurality of second weights are selectively removably mounted on the weight support laterally outwardly of the second end wall of the toolbox. A pair of bolts extend outwardly through the first end wall of the toolbox and extend through the first weights positioned laterally outwardly thereof to secure the weights to the toolbox. A pair of bolts also extend outwardly through the second end wall of the toolbox and extend through the second weights positioned laterally outwardly thereof to secure the second weights to the toolbox.

The positioning of the toolbox on the weight support provides a convenient location for the toolbox which is readily accessible and does not take up operator space within the cab or platform of the tractor.

It is therefore a principal object to provide a toolbox which is selectively removably mounted on the weight support at the forward end of a tractor.

A further object of the invention is to provide a toolbox which is positioned on the weight support of the tractor and which has weights positioned laterally outwardly of the end walls of the toolbox which are removably mounted on the weight support.

A further object of the invention is to provide a toolbox for mounting on the tractor which is quickly and easily removably mounted on the weight bracket thereof.

A further object of the invention is to provide a toolbox for a tractor which is durable in use, refined in appearance and is easily manufactured.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
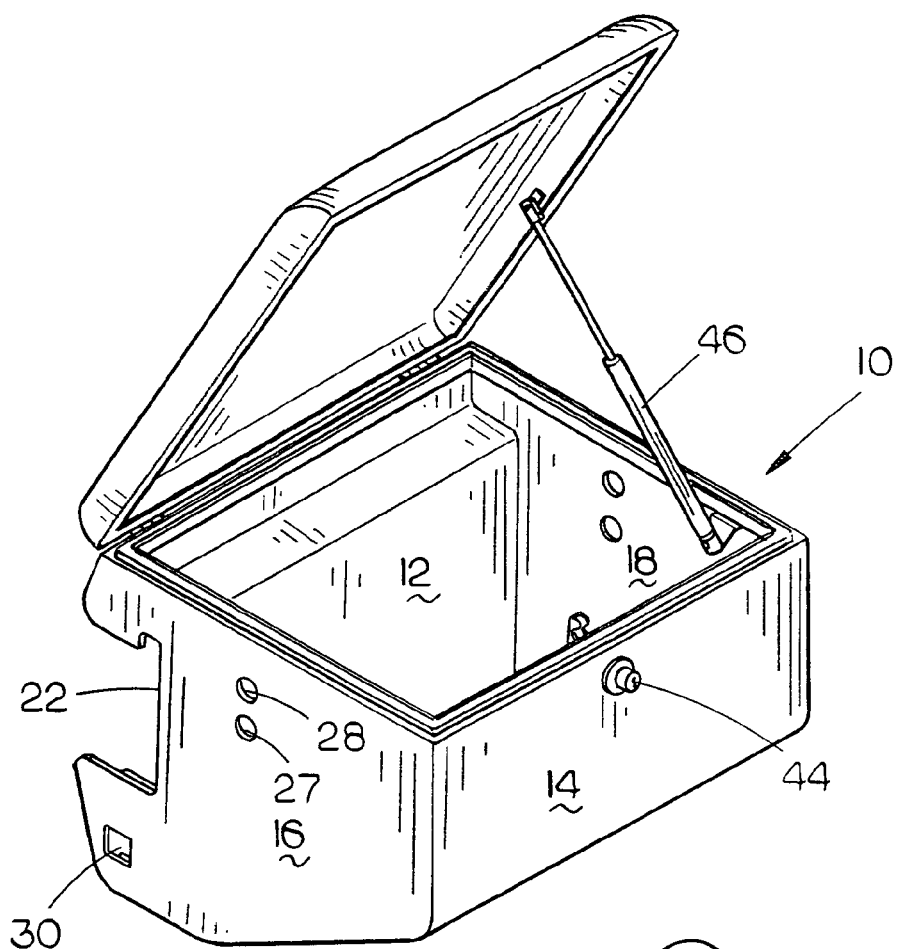
FIG. 1 is a front perspective view of the toolbox of this invention with the lid thereof in an open position.
Figure 2:
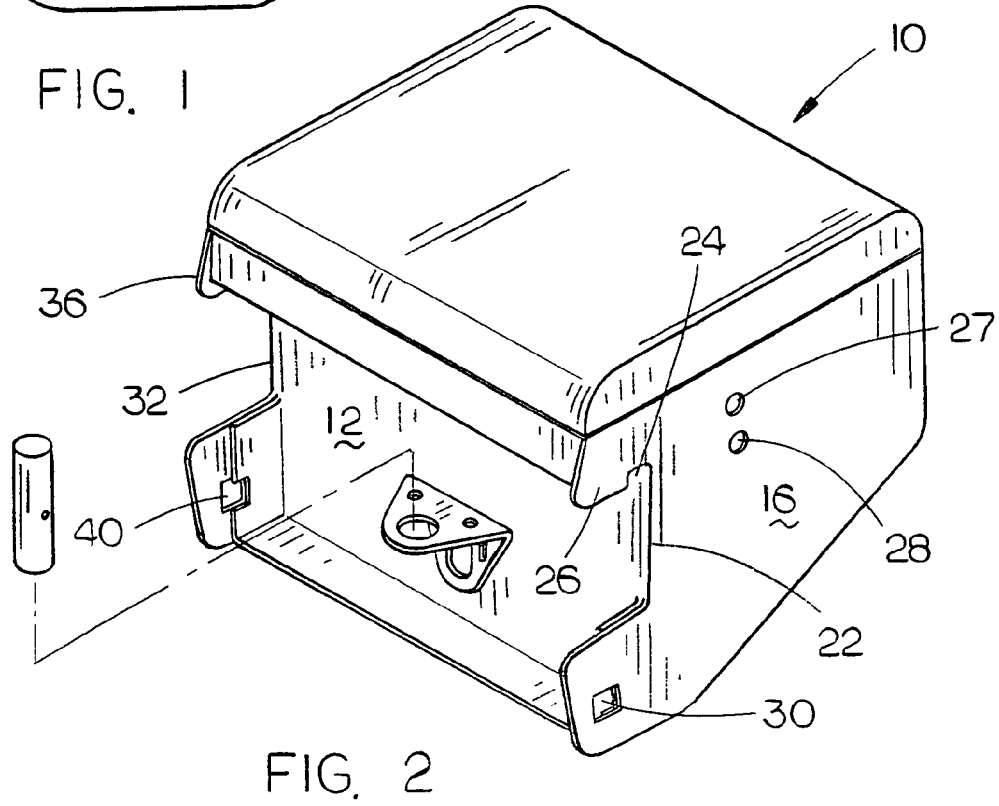
FIG. 2 is a rear perspective view of the toolbox of FIG. 1.
Figure 5:
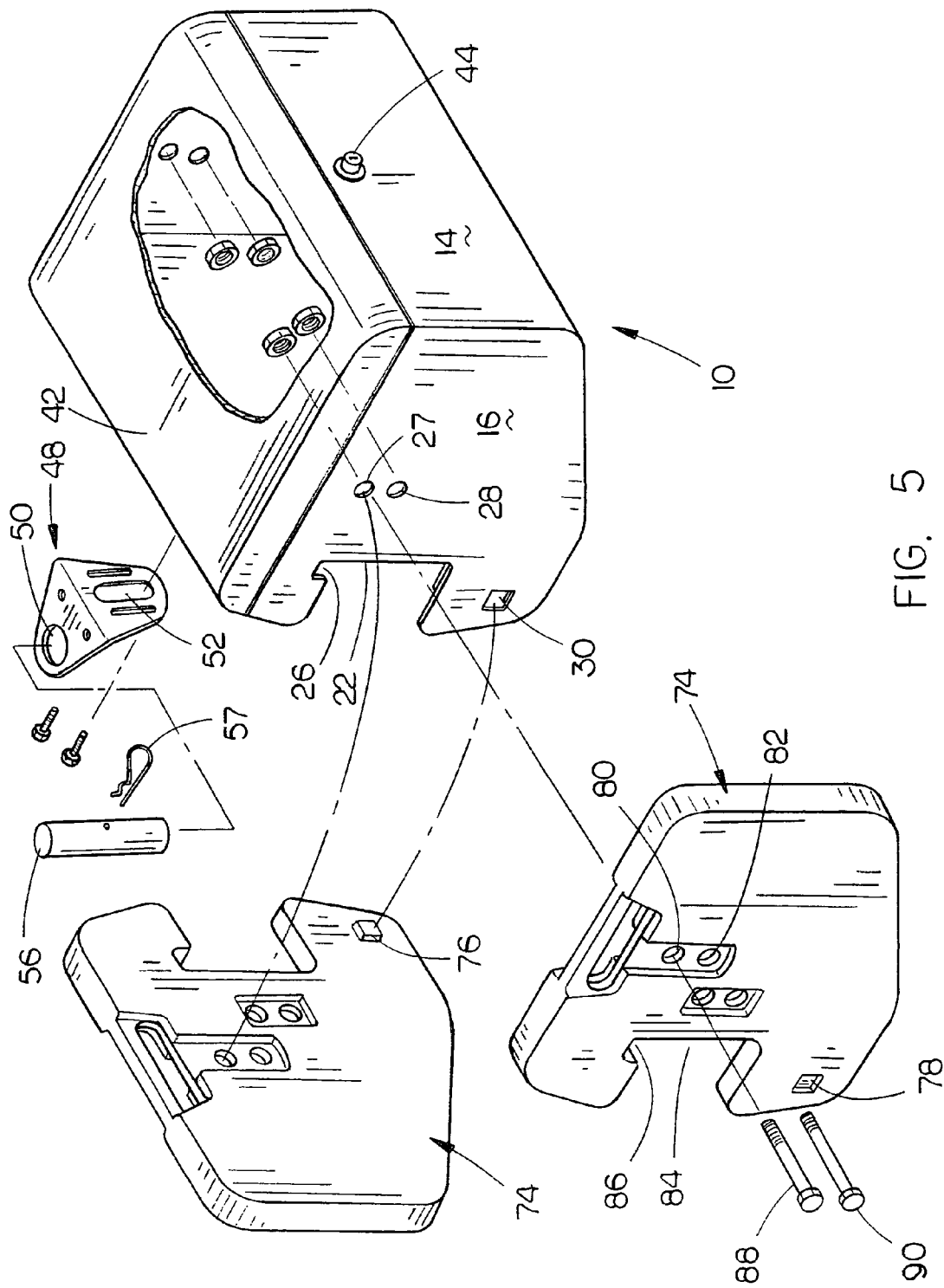
FIG. 5 is an exploded perspective view illustrating the manner in which weights may be secured to the toolbox.
Figure 6:
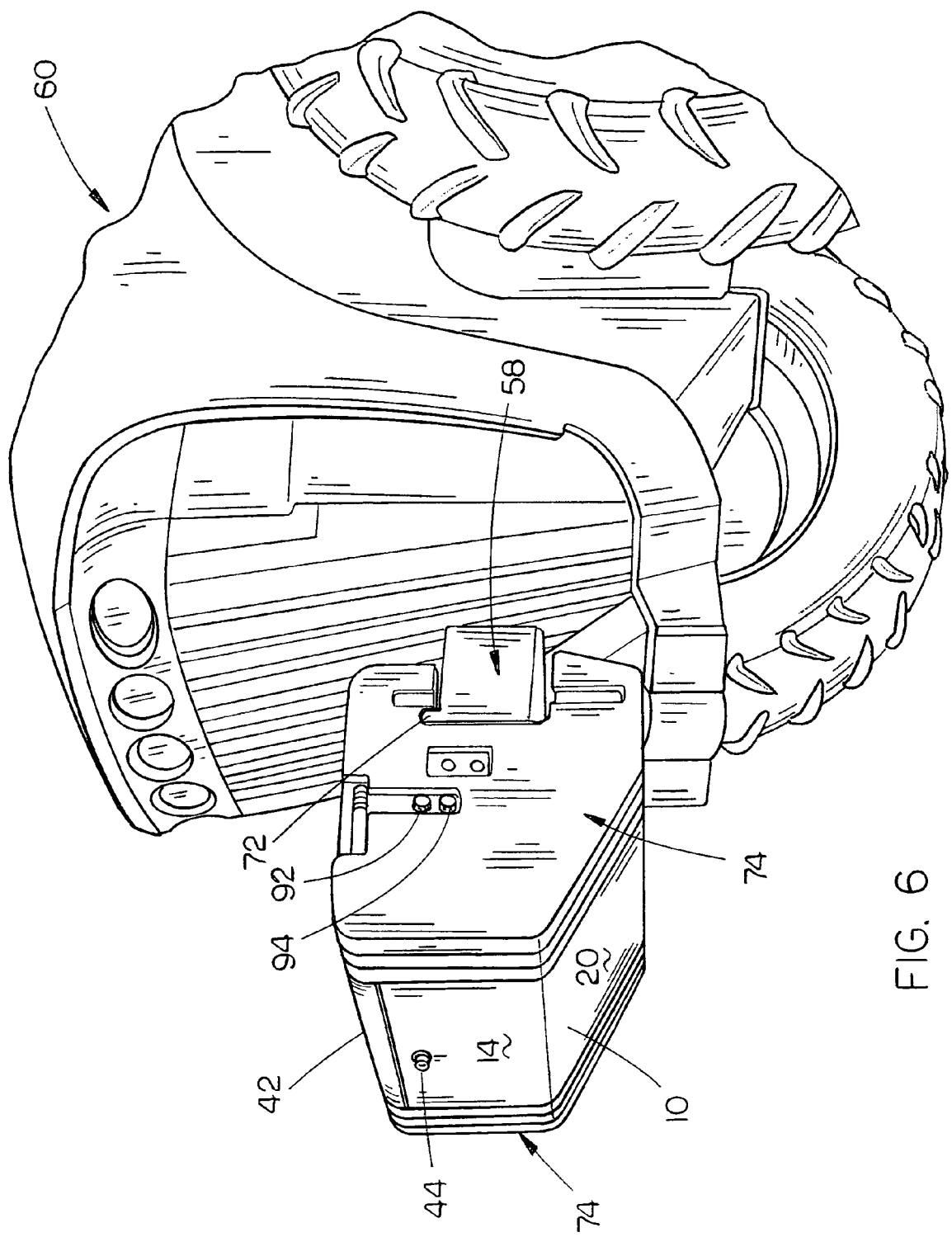
FIG. 6 is a front perspective view illustrating the toolbox of this invention mounted on the weight support of the tractor with a plurality of weights positioned at each end of the toolbox and which are secured to the toolbox.

The numeral 10 refers to the toolbox of this invention which includes a back wall 12, front wall 14, opposite end walls 16 and 18, and bottom wall 20. The rearward end of end wall 16 projects rearwardly of back wall 12 and has a recess or cut-away 22 formed therein which has a notch 24 formed therein positioned forwardly of nose portion 26 of end wall 16. End wall 16 has a pair of openings 27 and 28 formed therein as seen in FIGS. 1, 2 and 5. The lower rearward end of end wall 16 has an opening 30 formed therein.

The rearward end of end wall 18 projects rearwardly of back wall 12 and has a recess or cut-away 32 formed therein which has a notch 34 formed therein positioned forwardly of nose portion 36. End wall 18 has a pair of openings 37 and 38 formed therein and has an opening 40 formed therein at the lower rearward end thereof.

Toolbox 10 includes a lid or cover 42 with its rearward end being pivotally secured to the upper end of back wall 12. The lid 42 is able to be locked by means of lock assembly 44. A gas strut 46 is provided to yieldably maintain the lid 42 in its open position.

A selectively reversible angle bracket 48 is secured to the back wall 12 and has an opening 50 and a slot 52 formed therein. The angle bracket 48 may be selectively positioned on the back wall 12 in one of two positions. In one position, such as seen in FIG. 5, slot 52 is positioned against back wall 12 with opening 50 being positioned rearwardly of back wall 12 so that pin 56 may be extended through opening 50. In a second position, opening 50 is positioned adjacent back wall 12 with slot 52 being positioned rearwardly of back wall 12 so that the pin 56 may be extended therethrough. The purpose of providing the reversible angle bracket 48 is so that the toolbox may be secured to various different configurations of weight supports of a tractor as will be described in more detail hereinafter.

The toolbox 10 is designed to be mounted on a horizontally disposed weight support 58 which is positioned at the forward end of a tractor 60 in conventional fashion. Weight support 58 is normally a weight in itself and may weigh several hundred pounds. Weight support 58 includes a forward face 62, having a clevis-like opening 63 formed therein, rearward end 64, and opposite ends. Vertically disposed openings 70 and 71 extend downwardly through weight racket 58 between the ends thereof. The openings 70 and 71 are adapted to receive the pin 56 previously described. Pin 56 is maintained in openings 70 and 71 by a retainer 57. Weight support 58 has an upwardly extending lip 72 at its upper forward end.

Weight support 58 is adapted to support a plurality of weights 74 which are commonly referred to as suitcase weights with the weights 74 having opposite sides. One side of the weight 74 has a projection 76 extending therefrom while the other side of the weight 74 has a recess 78 formed therein which is adapted to receive the projection 76 of a weight 74 positioned adjacent thereto. Each of the weights 74 have at least a pair of openings 80 and 82 extending therethrough. Each of the weights have a cutout 84 formed in the rearward ends thereof which are adapted to receive the weight support 58 therein. Each the recesses 84 has a notch 86 formed therein which is adapted to receive the lip 72 of the weight support.

Figure 3:
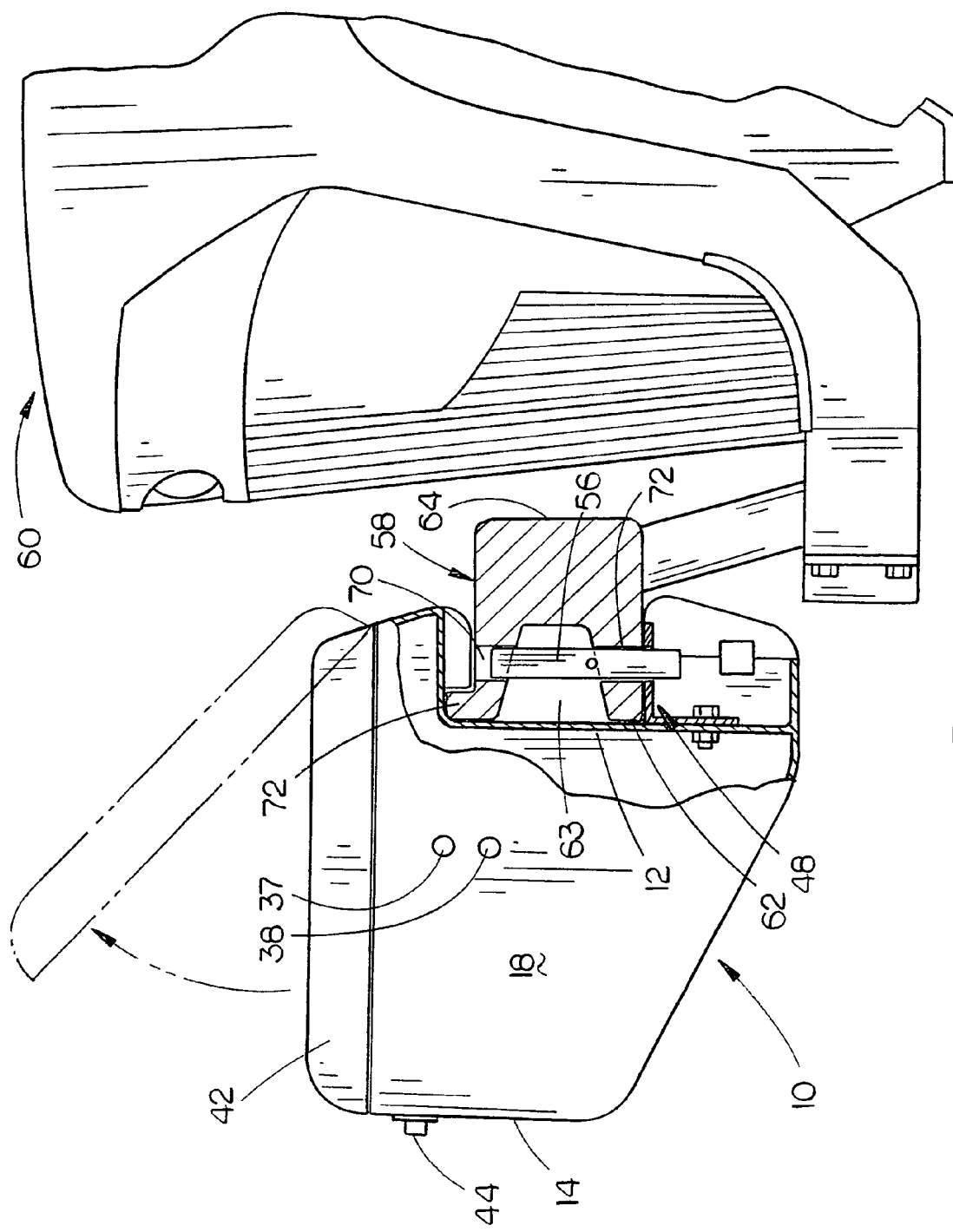
FIG. 3 is a partial side view illustrating the manner in which the toolbox is secured to the weight support at the forward end of a tractor with a portion of the weight support and toolbox cutaway to more fully illustrate the invention.
Figure 4:
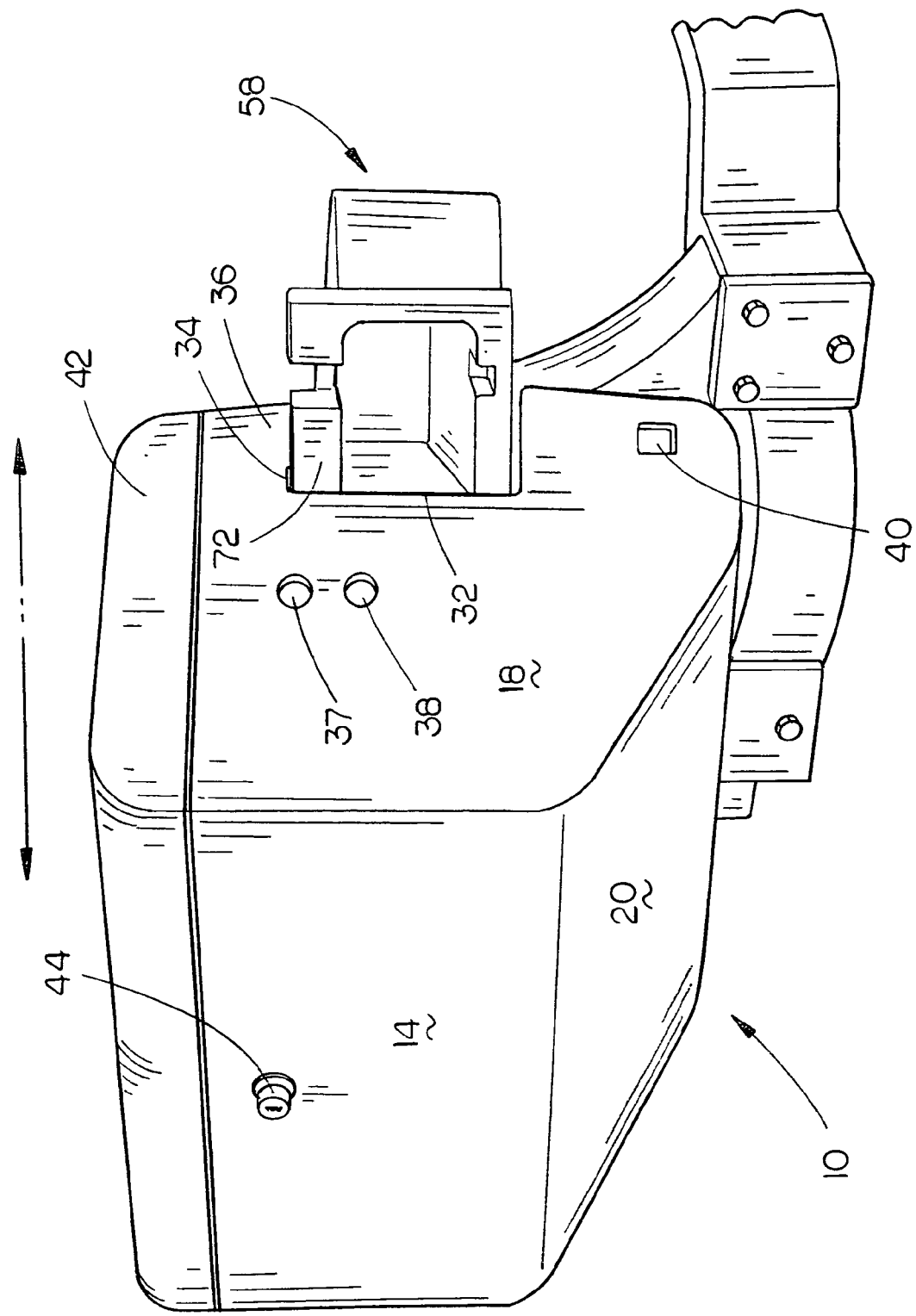
FIG. 4 is a front perspective view illustrating the toolbox mounted on the weight support of the tractor.

The toolbox 10 is mounted on the weight support 58 by maneuvering the toolbox 10 so that the weight support 58 is received within the recesses 22 and 32 of end walls 16 and 18 respectively and so that the notches 26 and 34 receive the lip 72 of the weight support 58. Pin 56 is then extended downwardly through the opening 70 in weight support 58 and through the opening 50 of the angle bracket 48 which is positioned below the weight support 58 as seen in FIG. 3.

Although the toolbox 10 may be mounted on the weight support 58 without weights 74 at each end thereof, a plurality of the weights 74 will usually be positioned on the weight support 58 on both sides of the toolbox 10. If the projection 76 on the weight 74 is facing end wall 16, the projection 76 will be received by the opening 30. If the projection on the weight 74 is facing end wall 18, the projection 76 will be received by the opening 40.

A pair of elongated bolts 88 and 90 are then extended through openings 80 and 82 respectively of the weights 74 through the openings 27 and 28 in end wall 16 and secured thereto by nuts or the like. Similarly, a pair of elongated bolts 92 and 94 are extended through the openings 80 and 82 in the weights 74 positioned laterally outwardly of end wall 18 and through the openings 37 and 38 in end wall 18 and secured thereto by nuts.

The attachment of weights to the toolbox prevent the weights from sliding laterally and also to stabilize the toolbox 10.

Thus, it can be seen that a novel toolbox has been provided which may be mounted on the conventional weight supports positioned at the forward end of a tractor with or without weights 74. The toolbox 10 is quickly and easily mounted on the weight support 58 and is quickly and easily removed therefrom as desired. The location of the toolbox 10 at the forward end of the tractor 60 provides convenient access to the toolbox and does not take up valuable space within the operator's cab. Thus, it can be seen that the invention accomplishes at least all of its stated objectives.

Although a particular shaped weight support 58 has been shown with the end walls 16 and 18 of toolbox 10 having particular shaped cutouts formed in the rearward ends thereof, the toolbox will be modified somewhat to enable it to be secured to different styles of weight supports and to be secured to different styles of weights.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
a tractor having a horizontally extending weight support at the forward end thereof;
and a toolbox selectively removably mounted on said weight support;
said weight support having a first end, a second end, a rearward side and a forward side;
said toolbox being positioned at said forward side of said weight support;
said toolbox being generally rectangular in shape and having a length less than the length of said weight support;
said toolbox comprising a bottom wall, a front wall, a back wall, a first end wall, a second end wall and a lid selectively closing said toolbox;
said back wall of said toolbox being positioned adjacent said forward side of said weight support;
means securing said back wall of said toolbox to said weight support;
said weight support having an upwardly extending lip at said forward side thereof;
each of said first and second end walls of said toolbox having rear end portions which extend rearwardly of said back wall of said toolbox;
each of said rear end portions of said first and second walls of said toolbox having a cut-out portion formed therein which receives said weight bracket;
each of said cut-out portions having a notch formed therein which receives said lip of said weight bracket.

2. In combination with a tractor having a forward end with a horizontally extending, elongated weight support, having a first end, a second end, a rearward side and a forward side, secured to the tractor which is positioned forwardly of the forward end of the tractor, comprising:
a toolbox selectively removably mounted on the weight support;
said toolbox being positioned at said forward side of said weight support;

said toolbox being generally rectangular in shape and having a length less than the length of said weight support;

said toolbox comprising a bottom wall, a front wall, a back wall, a first end wall, a second end wall and a lid selectively closing said toolbox;

said back wall of said toolbox being positioned adjacent said forward side of said weight support;

means securing said back wall of said toolbox to said weight support;

said weight support having an upwardly extending lip at said forward side thereof;

each of said first and second end walls of said toolbox having rear end portions which extend rearwardly of said back wall of said toolbox;

each of said rear end portions of said first and second walls of said toolbox having a cut-out portion formed therein which receives said weight bracket;

each of said cut-out portions having a notch formed therein which receives said lip of said weight bracket.

3. The combination of claim 2 wherein at least a first bolt member connects said first weights to said first end wall of said toolbox and wherein at least a second bolt member connects said second weights to said second end wall of said toolbox.

4. The combination of claim 2 wherein said weight support has an upwardly extending lip at said forward side thereof and wherein each of said first and second end walls of said toolbox have rear end portions which extend rearwardly of said back wall of said toolbox, each of said rear end portions of said first and second end walls of said toolbox having a cut-out portion formed therein which receives said weight bracket and wherein each of said cut-out portions have a notch formed therein which receives said lip of said weight bracket.

5. The combination of claim 2 wherein each of said weights have opposite sides and wherein one side of each of the weights have a recess formed therein and wherein the other side of each of the weights have a mating protrusion extending therefrom which is adapted to be received by the recess in an adjacent weight and wherein at least one of side end walls of said toolbox has an opening formed therein adapted to receive the protrusions of the weight adjacent thereto therein.

* * * * *